March 20, 1962  H. HESS  3,025,942
LINE SHIFTING CONTROL ARRANGEMENT
Filed June 3, 1960  3 Sheets-Sheet 2

INVENTOR.
Hans Hess
BY
Michael S. Striker
Attorney

March 20, 1962  H. HESS  3,025,942
LINE SHIFTING CONTROL ARRANGEMENT
Filed June 3, 1960  3 Sheets-Sheet 3

INVENTOR.
Hans Hess.
BY
Michael S. Striker
Attorney

United States Patent Office 3,025,942
Patented Mar. 20, 1962

3,025,942
LINE SHIFTING CONTROL ARRANGEMENT
Hans Hess, Wilhelmshaven, Germany, assignor to
Olympia Werke A.G., Wilhelmshaven, Germany
Filed June 3, 1960, Ser. No. 33,674
Claims priority, application Germany June 8, 1959
20 Claims. (Cl. 197—66)

The present invention relates to a line shifting control arrangement for shifting the platen of a business machine, such as an electric typewriter or calculator.

The U.S. Patent 2,919,006 discloses an arrangement for actuating line shifting means and carriage return means under control of keys, and under control of the carriage. According to the prior art, a line spacing operation and a carriage return operation are successively carried out upon actuation of the control key, and when the carriage arrives at its end position, a switch is actuated which disconnects the line shifting means.

The constructions of the prior art are controlled by a control switch, which may be operated by a control key, by a control tape, or by a punch card. If a repeated actuation of the line shifting means is desired, the control switch must be held in actuated position until all necessary line spacing operations are completed.

It is one object of the present invention to overcome this disadvantage of the prior art, and to provide a line shifting control arrangement which successively performs a selected number of line spacing operations.

Another object of the present invention is to provide a line shifting arrangement which is settable to perform consecutive series of line spacing operations corresponding to the lay-out of a form which is to be filled in.

Another object of the present invention is to provide a line shifting arrangement with selector means which are, respectively, correlated with lines of a series of lines, and can be set to effect successive line spacing operations until a preset line is reached, and which continues with another series of line spacing operations after a typing operation was performed in the respective line, and the carriage returned.

Another object of the present invention is to provide an automatic line shifting arrrangement settable to perform series of line spacing operations, but being also controlled by an operator-influenced line shifting key, and by a line shifting and carriage return key.

Another object of the present invention is to provide a line shifting control arrangement incorporating a keyboard with manually settable selector keys.

A further object of the present invention is to combine the automatic line shifting control arrangement with tabulator means so that a series of line spacing operations is carried out after the tabulator means have moved the carriage of the machine between a plurality of positions associated with different columns of the form.

With these objects in view, the present invention mainly consists in a control arrangement which is settable to effect in a business machine, such as a typewriter, a plurality of series of successive line spacing operations by which the platen of the typewriter is turned.

One embodiment of the present invention comprises a set of selector contact means correlated with a series of lines; a set of contact means respectively connected in series with the selector contact means; control means for successively actuating the control contact means; and line shifting means connected to the control means for actuating the same after each line shifting operation. Assuming that a form is to be filled in, the respective lines of the form are selected by actuating the respecive selector contact means, either under control of push buttons or under control of a tape or punched card. In the preferred embodiment of the invention, the actuated selector contact means are opened. When the line shifting means are actuated, for example, by a start switch, a series of line spacing operations is automatically carried out. Every time the platen of the business machine is turned to the next following typing position, another control contact means is actuated and closed by the control means, which is preferably a stepping mechanism actuated by an electromagnetic means under control of the line shifting means. As long as control contact means connected in series with non-selected selector contact means are actuated, the line shifting operations continue. When a control contact means connected in series with an actuated and open selector contact means, is acuated, the circuit of the line shifting means is interrupted so that no further line shifting operation is carried out. In this position, the form on the platen is in a position in which a line may be typed. At the end of the line, or in a position determined by tabulator means, the carriage is returned to its initial position, while simultaneously the line shifting means are again actuated to effect successive line spacing operations until a line is reached which was previously selected by actuation of the respective selector contact means. The control arrangement of the present invention is preferably used in combination with a business machine in which the carriage is returned by winding up a drawband connected to the line shifting lever. In this manner, a line spacing operation is automatically carried out when the carriage is returned.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
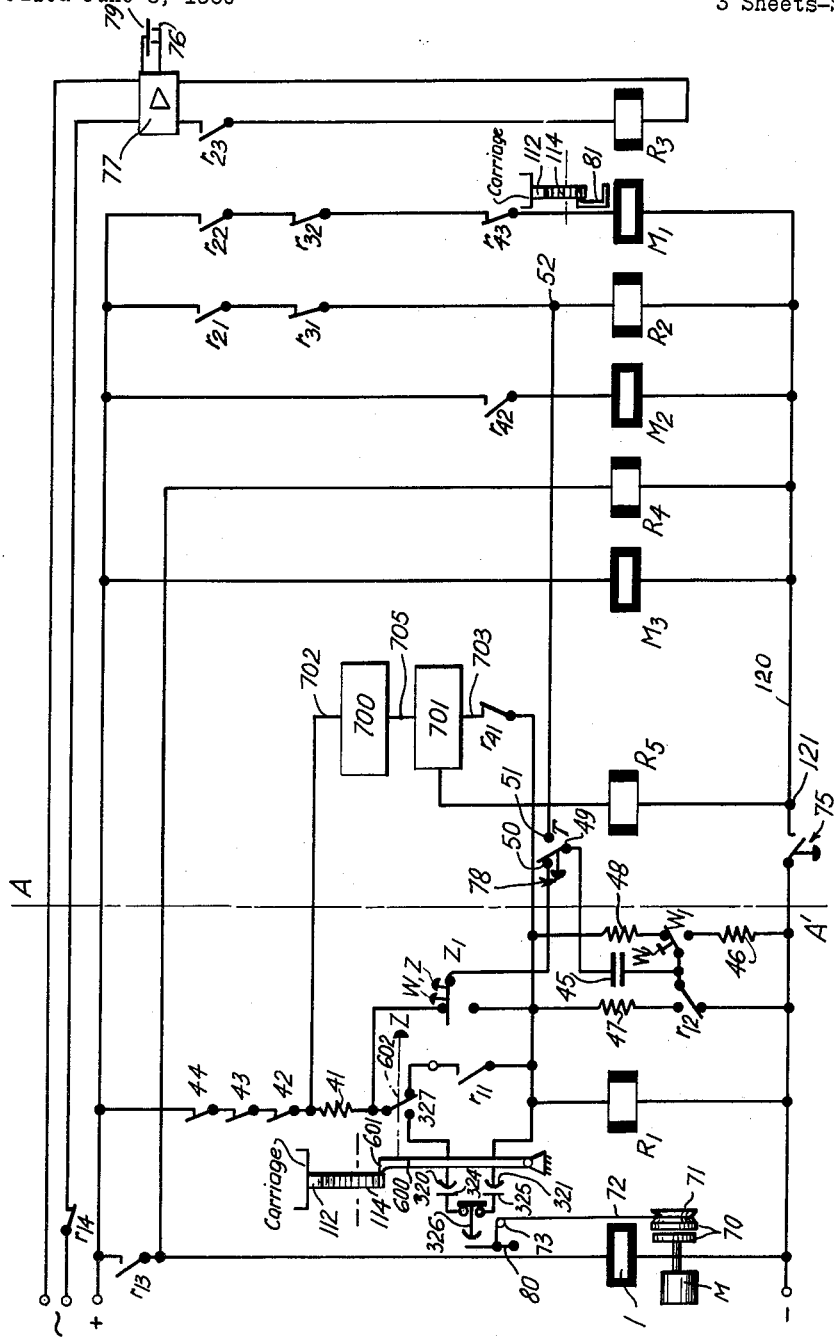
FIG. 1 is a diagram illustrating the control arrangement of the present invention as connected to a known control circuit for line shifting means and carriage return means.

Referring now to the drawings, and more particularly to FIG. 1, the portion of the diagram on the left of the line A—A is a known control circuit described and illustrated in detail in the U.S. Patent 2,919,006. Since this patent describes the arrangement in detail, mechanical elements are only schematically shown in the diagram of FIG. 1.

An electromagnetic means 1 controls a coupling means such as a friction clutch 70, one part of which is secured to a reel 71 on which a drawband is wound when clutch 70 connects motor M to reel 71. The end of the drawband 72 is connected to a shifting lever 80 which controls the conventional line spacing device for the platen. When control key W is actuated, coupling 70 is engaged, lever 80 is shifted, and thereupon the carriage is returned to its initial position. When the control key Z is actuated, the carriage return movement is automatically locked, and engagement of coupling 70 effects only a line spacing operation by lever 80.

The line spacing key Z is mechanically connected by connecting means indicated at 602 to another means 600 including a locking stop 601. When control key Z is actuated, stop 601 engages a pinion 114 which meshes with a rack bar 112 connected to the carriage of the business machine. Consequently, the carriage movement is temporarily blocked, while contacts 320, 321 are closed and prepare through switch 326 the circuit of the relay $R_1$. Relay $R_1$ controls contacts $r_{11}$, $r_{12}$, $r_{13}$ and $r_{14}$ which are normally in the illustrated positions from which they are shifted when relay $R_1$ is energized.

As shown in the U.S. Patent 2,919,006, switch 326 is mounted on the carriage of the typewriter and is opened by the line spacing lever after a line spacing operation has been completed.

When line spacing key Z is actuated, stop 601 blocks movement of the carriage, whereupon contacts 320, 321 close. During the last part of the movement of control key Z, switch 327 is shifted so that the circuit of relay $R_1$ is completed. Relay $R_1$ is energized, relay contact $r_{13}$ connects electromagnetic means 1 to a source of direct current, coupling 70 is engaged, and the line spacing lever 80 is operated so that a line spacing operation is performed. When the platen is shifted one step, switch 326 opens. Relay $R_1$ is de-energized, relay contact $r_{13}$ opens, clutch 70 is disengaged, and line spacing lever 80 returns to its initial position under the action of a spring. This effects closing of switch 326 which has no influence on relay $R_1$ if control key Z was released by the operator in the meantime. If control key Z was held in its actuated position, line spacing operations are repeated until control key Z is released. Since the carriage is locked, no carriage movement can take place.

Carriage return key W effects a line shifting operation and a consecutive carriage return operation. Actuation of control key W effects shifting of switches $z_1$ and $w_1$. Switch $z_1$ is also shifted by operation of control key Z, as schematically indicated by the reference characters W, Z. When control key W is actuated, relay $R_1$ is energized by a discharge from capacitor 45, and holds itself by holding contact $r_{11}$, while simultaneously closing contact $r_{13}$ so that electromagnetic means 1 is actuated, and moves clutch 70 to the coupling position. The drawband 72 exerts a pull on lever 80 which is sufficient for effecting a line spacing operation, but insufficient to move the carriage until the line spacing operation is completed by lever 80. Switch 326 is opened, but has no effect since the circuit of relay $R_1$ is completed by contact 327, and holding contact $r_{11}$. After completion of the line spacing operation, the pull of the drawband 72 is transferred to the carriage, so that the same is returned to its initial end position. In this end position, the carriage engages a limit switch 44, which interrupts the circuit of relay $R_1$. The line spacing operation and the carriage return movement are thus completed.

The known arrangement further includes another limit switch 43 operated by the carriage in its other end position, and a switch 42 associated with the space bar and being of no significance for the present invention. Resistors 41, 46, 47 and 48 are connected into the circuit for purposes explained in the U.S. Patent 2,919,006 which also discloses the charging of capacitor 45.

The control arrangement according to the present invention is shown in FIG. 1 on the right of line A—A'. Manually operated switches 75 and 78 connect the control arrangement to the known apparatus.

Figure 2:
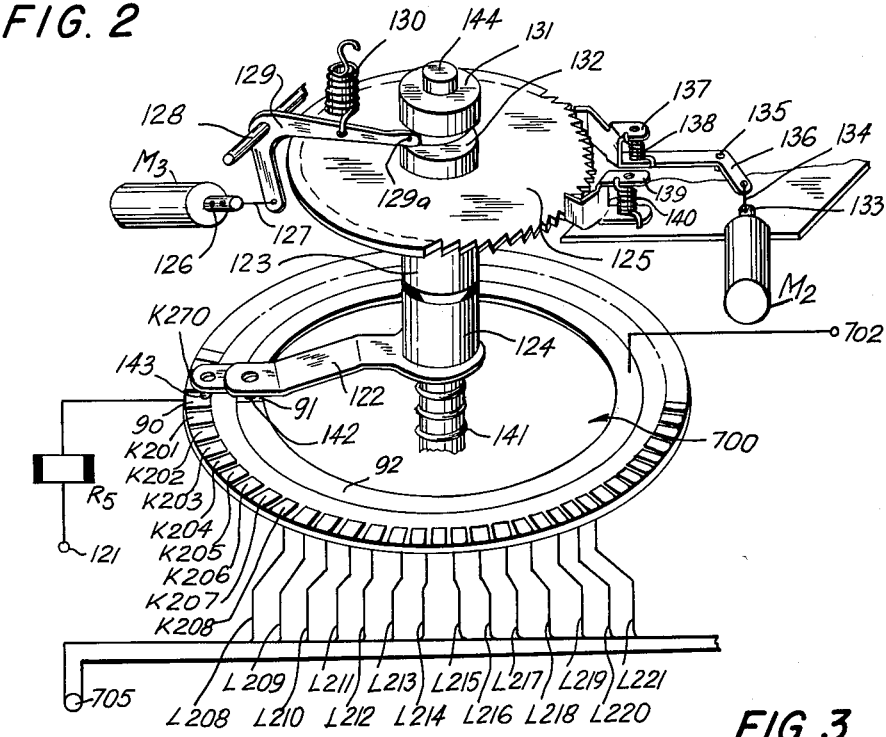
FIG. 2 is a perspective and partly diagrammatic view illustrating a stepping mechanism forming part of the control circuit of FIG. 1.
Figure 3:
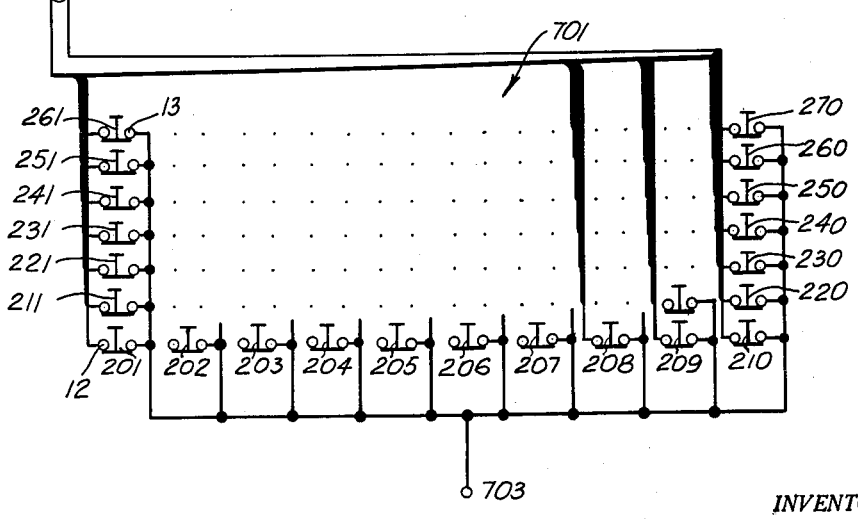
FIG. 3 is a schematic diagram illustrating a selector contact arrangement forming part of the control circuit illustrated in FIG. 1.

The control arrangement includes an electrically operated stepping mechanism 700, shown in detail in FIG. 2, and a set of selector contact means 701, shown in detail in FIG. 3.

Referring now to FIG. 3, a set of selector contact means 201 to 270 is shown which are preferably controlled by push buttons as will be explained with reference to FIG. 4. However, the selector contact means 201 to 270 may also be controlled by a program tape, or by a punched card. The selector contact means are normally closed, but assume a circuit-breaking open position, when actuated. One terminal 13 of each selector contact means is connected to a conductor 703 which is connected to the line shifting arrangement through a normally closed relay $r_{41}$ controlled by a delayed action relay $R_4$. The same relay controls relay contact $r_{42}$ and relay contact $r_{43}$ which are, respectively, connected in series with an electromagnetic means $M_2$ and an electromagnetic means $M_1$. The other terminals 12 of the selector contact means 201 to 270 are respectively connected through conducts $L_{201}$ to $L_{270}$ to a set of control contacts $K_{201}$ to $K_{270}$ which are arranged in a circle. All parallel lines $L_{201}$ to $L_{270}$ are designated by the reference numeral 705 in FIG. 1. The control contacts $K_{201}$ to $K_{270}$ are successively engaged by a movable contact 143 mounted on a turnable contact arm 122 which carries another contact 142 sliding on a contact ring 92 which is connected by a conductor 702 and a resistor 41 to switch 327. Contact arm 122 is secured to a coupling part 124 which is turnable and axially shiftable on a shaft 144, and is urged by spring 141 into frictional engagement with another coupling part 123. A stepping wheel 125 of a stepping mechanism is secured to coupling part 123 and is turnable and axially shiftable with the same on shaft 144. The hub 131 of stepping wheel 125 has a circular groove 132 engaged by the end portion 129a of an angular lever 129 which is turnable with a shaft 128. A spring 130 is connected to lever 129, and urges the same to assume a position in which coupling 123, 124 is disengaged. An electromagnetic means $M_3$ has an armature 126 connected by a link 127 to lever 129, so that coupling means 123, 124 is moved to a coupling position when electromagnetic means $M_3$ is energized which is effected when switch 75 in FIG. 1 is closed. As long as coupling means 123, 124 is disengaged, spring 141 urges arm 122 to a slightly raised position in which contact 142 is separated from contact ring 92, and contact 143 is separated from the control contacts $K_{201}$ to $K_{270}$. Contact ring 92 is interrupted by an insulator piece 91 which is radially aligned with a contact 90 cooperating with movable contact 143 and connected to a relay $R_5$ whose other terminal is connected at a point 121 to the manually operated switch 75 and to a line 120 which is connected to the electromagnetic means $M_1$, $M_2$, and $M_3$, and to the relays $R_2$ and $R_4$ as shown in FIG. 1. The electromagnetic means $M_2$ has an armature 133 which is connected by link 144 to an angular lever 136 which is turnable about a pivot 135. When electromagnetic means $M_2$ is energized by closing of relay contact $r_{42}$ under control of the delayed action relay $R_4$, lever 136 actuates a pawl 137 controlled by a spring 138 so that the stepping wheel 125 is shifted one step after which the arresting pawl 139 again locks stepping wheel 125 under control of a spring 140. Pawls 137 and 139 are constructed to permit axial movement of the stepping wheel under control of lever 129 and electromagnetic means $M_3$. Whenever electromagnetic means $M_2$ is energized, stepping wheel 125 will turn one step, and if electromagnetic means $M_3$ is energized and effects coupling of stepping wheel 125 to arm 122, contact 143 will move one step to the respective next following control contact of the set of control contacts $K_{201}$—$K_{270}$.

In the illustrated embodiment, the control arrangement cooperates with a tabulating device by which the carriage is stopped in positions corresponding to columns on a form to be filled in. A feeler contact 76 slides on the form during the carriage movement, and the form is provided with conductive column boundary lines diagrammatically indicated at 79 in FIG. 1. When feeler lever 76 is located on a conductive line 79, an impulse is created which passes through an amplifier 77 which is connected to a source of alternating current by the relay contact $r_{14}$ of relay $R_1$, and to a relay $R_3$ by a relay contact $r_{23}$ of relay $R_2$. When relay contact $r_{23}$ is closed, relay $R_3$ is energized and opens relay contacts $r_{31}$ and $r_{32}$. Electromagnetic means $M_1$ is de-energized, and releases a spring-loaded stop projection 81 which engages and locks a pinion 114 meshing with a rack 112 on the carriage. Consequently, the carriage is stopped and locked by stop projection 81 when feeler lever 76 senses a conductive line 79 defining a column. This arrangement is known, but is advantageously used in the combination of the present invention.

In the illustrated embodiment of the present invention, seventy selector contacts are provided which are respectively correlated with seventy lines which may be typed on a form. Lines in which a typing operation is required are selected by actuating and opening the respective selector contact means. It is desired that the actuated selector contact means are locked after they were set by the operator.

Figure 4:
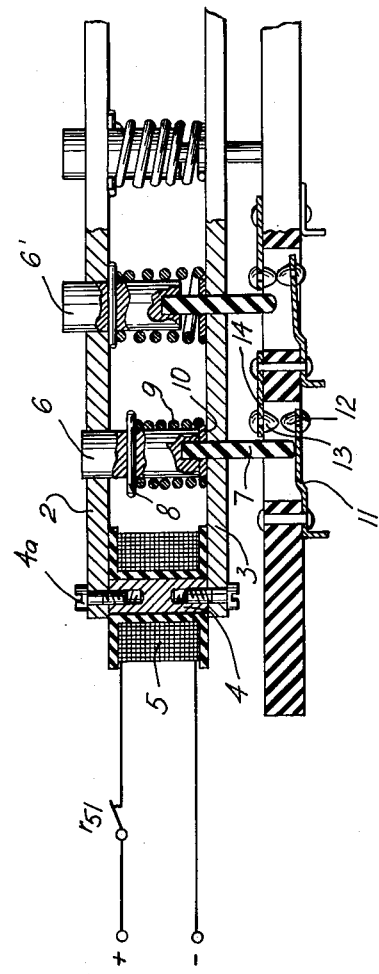
FIG. 4 is a fragmentary sectional view illustrating a locking arrangement for selector push buttons for operating the selector contact means shown in FIG. 3.

As shown in FIG. 4, two supporting plates 2 and 3 are connected by spacing members 4 and screws 4a. Only one connecting member 4 is illustrated in FIG. 4. Members 2, 3 and 4 consist of magnetizable iron, and members 4 serve as cores for windings 5. All windings 5, only one of which is shown, are connected in series with each other and with relay contact $r_{51}$ of relay $R_5$ shown in FIG. 1.

Push buttons 6 are guided in corresponding bores of plate 2, and have stops 8 against which springs 9 abut. Insulating pins 7 are secured to push buttons 6 and pass through corresponding bores in plate 3. A brass washer 10 surrounds each insulating pin 7, and separates push button 6 from plate 3. Push buttons 6 are magnetically conductive, but interrupt the magnetic flux produced by windings 5 in the inoperative position 6'. When a push button 6 is depressed until it engages the brass washer 10, the flux is sufficiently strong to hold an actuated push button 6 in the actuated position. Consequently, all selected and actuated push buttons 6 are locked in the actuated position thereof until relay contact $r_{51}$ opens and terminates the flux produced by windings 5. Each insulating pin 7 of an actuated push button 6 engages a contact spring 11 and separates a contact 12 thereon from a contact 13 carried by another contact spring 14. Contact means 11 to 14 correspond to one of the selector contact means 201 to 270 described with reference to FIG. 3. It is evident that push buttons 6 may be operated by electromagnetic means from a remote station.

The apparatus operates in the following manner: The form is inserted into the typewriter, or other business machine, while the carriage is in any position. The operator depresses the push buttons 6 corresponding to the lines of the form in which typing is intended. Each selector contact means 201 to 270 is correlated to one of the lines of the form. Evidently, the form may have fewer lines than seventy, but if the form has more lines than 70, then it would be necessary to provide a greater number of selector contacts. It is assumed that selector contact means 208 is actuated and is in the circuit breaking position shown in FIG. 3.

Switch 75 is actuated, and conductor 120 is connected to the negative terminal of the source of direct current. The control arrangement is thus connected to the known arrangement shown on the left of line A—A' in FIG. 1. When switch 75 is closed, electromagnetic means $M_3$ is energized, and as explained with reference to FIG. 2, shifts coupling part 123 and effects coupling of stepping wheel 125 to contact arm 122, against the action of spring 141. Contact 143 of contact arm 122 is located on control contact $K_{201}$, while contact 142 engages the contact ring 92. The circuit of relay $R_1$ is closed as follows: From the plus terminal through switches 44, 43, 42, conductor 702, contact ring 92, contact 142, contact arm 122, contact 143, control contact $K_{201}$, conductor $L_{201}$, selector contact means 201, conductor 703, the normally closed contact $r_{41}$, and through the winding of relay $R_1$ to the negative terminal of the source of direct current.

Relay $R_1$ is energized, so that relay contacts $r_{11}$ and $r_{13}$ close, and relay contact $r_{12}$ is shifted. Contact $r_{13}$ connects the electromagnetic means 1 of clutch 70 and relay $R_4$ into the circuit. Relay $R_4$ opens the normally closed relay contacts $r_{41}$ and $r_{43}$ and closes the normally open relay contact $r_{42}$ so that electromagnetic means $M_2$ is energized and operates through lever 136 and pawl 137, the stepping wheel 125 and the contact arm 122. Contact arm 122 is shifted one step so that control contact means $K_{202}$, 143, 142 and 92 are connected into the circuit. Since relay contact $r_{41}$ opens, the circuit of relay $R_1$ is interrupted. However, relay $R_1$ remains energized since the holding contact $r_{11}$ is closed. The opening of contact $r_{43}$ in the circuit of electromagnetic means $M_1$, and the shifting of contact $r_{12}$ have no effect at this point of the operation.

Since electromagnetic means 1 shifts clutch 70 to its engaged position, the drawband 72 first shifts lever 80 to effect a line spacing operation, whereupon the carriage is pulled to its initial writing position through lever 80. When the carriage is returned to its initial position, limit switch 44 is opened so that the holding circuit of relay $R_1$ is interrupted, and relay $R_1$ is de-energized. Contact $r_{13}$ opens so that electromagnetic means 1 and relay $R_4$ are de-energized. Clutch 70 is immediately disengaged, while the delayed action relay $R_4$ is de-energized after a certain time period, so that contact arm 122 can be shifted. After de-energizing of relay $R_4$, contact $r_{41}$ closes so that relay $R_1$ is again energized, and effects another line spacing operation.

While the carriage remains in its initial position, line spacing operations are successively carried out until contact arm 122 is shifted to a position in which its contact 143 engages a control contact which is connected in series with an actuated selector contact means which is in circuit-breaking position. This is, for example, the selector contact means 208. Since contact means 208 is open, the circuit of relay $R_1$ is interrupted, relay $R_1$ is de-energized, and the line shifting operations are terminated, and the platen remains in a position in which the eighth line of the form is positioned to receive a typed imprint.

A tabulating operation may now be started to move the carriage between several column positions. Tabulator key 78 is actuated so that movable contact 49 is shifted from contact 50 to contact 51. Relay $R_2$ is thus connected in parallel to the charged capacitor 45, so that the discharge current energizes relay $R_2$ which actuates relay contacts $r_{21}$, $r_{22}$ and $r_{23}$. Relay contact $r_{21}$ holds relay $R_2$ energized, while contact $r_{22}$ closes the circuit of electromagnetic means $M_1$, and contact $r_{23}$ prepares the circuit of relay $R_3$. Electromagnetic means $M_1$ is energized, and operates the stop projection 81 to release the pinion 114 which meshes with rack bar 112 on the carriage. The carriage is released, and starts its tabulating movement.

During such movement of the carriage, the feeler lever 76 slides on the form until it meets a conductive boundary line of a column. The thus created impulse is amplified in amplifier 77, and relay $R_3$ is energized through the closed contact $r_{23}$. Contacts $r_{31}$ and $r_{32}$ open. Contact $r_{32}$ effects de-energizing of electromagnetic means $M_1$ so that the spring-loaded stop projection 81 is released, and locks the carriage in the respective column position. Relay $R_2$ is de-energized by contact $r_{31}$ and opens contacts $r_{21}$, $r_{22}$ and $r_{23}$ so that the circuits of relays $R_2$ and $R_3$, and of electromagnetic means $M_1$ are interrupted, as shown in FIG. 1.

An insert can now be typed in the selected line in the respective column, whereupon the tabulator key 78 may be again actuated so that the carriage moves to the next following column where it is stopped when feeler 76 engages the conductive boundary line of the respective following column. When typed inserts have been made in all selected columns, tabulator key 78 can be operated to move the carriage to its terminal position so that limit switch 43 opens.

It is evident that a complete line may have been typed in the eighth line of the form until the carriage has arrived in its terminal position and operated limit switch 43.

In any event, when the carriage opens limit switch 43, relays $R_1$ and $R_4$ are de-energized so that electromagnetic means $M_2$ is energized since contact $r_{42}$ closes. Electromagnetic means $M_2$ effects shifting of the stepping mechanism 702 through another step so that control contact 209 is connected into the circuit. Assuming that the correlated selector contact means 209 was not actuated, and is consequently in circuit-closing position, relay $R_1$ is energized and effects a line spacing operation after which the carriage is returned to its initial terminal position. In this carriage position, the line spacing operations are repeated by lever 80 until contact 143 engages a control contact of the control contacts $K_{201}$ to $K_{270}$, which is connected to a selected and actuated selector contact means in circuit-breaking position. When this happens, the circuit of relay $R_1$ is interrupted, and the line spacing operations are terminated so that another typing operation may be performed in the respective selected line.

When the contact arm 122 has passed over all control contacts $K_{201}$ to $K_{270}$, contact 143 arrives at contact 90, while contact 142 engages the insulating piece 91. The circuit of relay $R_1$ is interrupted. Relay $R_4$ is de-energized after a delay, so that electromagnetic means $M_2$ effects shifting of the stepping mechanism through another step which brings contact arm 122 into the initial position in which contact 143 is located opposite control contact $K_{201}$. In the position in which contact 143 engages contact 90, relay $R_5$ is energized, which opens relay contact $r_{51}$ whereby the selector contact means are unlocked, and return to the inoperative closed position, as described with reference to FIG. 4.

The initial position of the control arrangement is thus restored, and the apparatus is ready for setting of the selector contact means to a new program corresponding to another form.

It will be understood that each of the elements described above, or two or more together, may also find a useful application in other types of control arrangements for business machines differing from the types described above.

While the invention has been illustrated and described as embodied in a control arrangement for effecting selectable series of line spacing operations in a business machine, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characterisics of the generic or specific aspects of this invention and, therefore, such adaptations should and are intended to be comprehended within the meaning and range of equivalence of the following claims.

What is claimed as new and desired to be secured by Letters Patent is:

1. A control arrangement for business machines, comprising, in combination, a set of selector contact means respectively correlated with a series of lines, each selector contact means having an actuated position and being settable to said actuated position; a set of control contact means respectively connected in series with said selector contact means, each control contact means having an actuated position, said actuated positions of one of said sets of contact means being circuit-breaking positions, and said actuated positions of the other set of contact means being circuit-closing positions; control means for successively actuating said control contact means to assume said actuated position; electrically operated line shifting means connected to said control means for actuating the same after each line shifting operation; and circuit means connecting said sets of contact means with said line shifting means whereby said line shifting means successively performs line spacing operations until said control means actuates a control contact means connected in series with a selector contact means set to said actuated position thereof.

2. A control arrangement for business machines, comprising, in combination, a set of selector contact means respectively correlated with a series of lines, each selector contact means having an actuated position and being settable to said actuated position; a set of control contact means respectively connected in series with said selector contact means, each control contact means having an actuated position, said actuated positions of one of said sets of contact means being circuit-breaking positions, and said actuated positions of the other set of contact means being circuit-closing positions; control means electrically actuatable for successively actuating said control contact means to assume said actuated position; electrically operated line shifting means connected to said control means for actuating the same after each line shifting operation; and circuit means connecting said sets of contact means with said line shifting means and including a switch for actuating said line shifting means whereby said line shifting means successively performs line spacing operations until said control means actuates a control contact means connected in series with a selector contact means set to said actuated position thereof.

3. A control arrangement for business machines, comprising, in combination, a set of selector contact means respectively correlated with a series of lines, each selector contact means having an actuated position and being settable to said actuated position; a set of control contact means respectively connected in series with said selector contact means, each control contact means having an actuated position, said actuated positions of one of said sets of contact means being circuit-breaking positions, and said actuated positions of the other set of contact means being circuit-closing positions; a stepping mechanism for successively actuating said control contact means to assume said actuated position; electrically operated means for actuating said stepping mechanism; electrically operated line shifting means connected to said electrically operated means for actuating the same after each line shifting operation; and circuit means connecting said sets of contact means with said line shifting means whereby said line shifting means successively performs line spacing operations until said stepping mechanism actuates a control contact means connected in series with a selector contact means set to said actuated position thereof.

4. A control arrangement for business machines, comprising, in combination, a set of selector contact means respectively correlated with a series of lines, each selector contact means having an actuated position and being settable to said actuated position; a set of control contact means respectively connected in series with said selector contact means, each control contact means having an actuated position, said actuated positions of one of said sets of contact means being circuit-breaking positions, and said actuated positions of the other set of contact means being circuit-closing positions; control means electrically actuatable for successively actuating said control contact means to assume said actuated position; electrically operated coupling means for coupling said control means with said control contact means; electrically operated line shifting means connected to said control means for actuating the same after each line shifting operation; and circuit means connecting said sets of contact means with said line shifting means and including a switch for actuating said line shifting means and said coupling means whereby said line shifting means successively performs line spacing operations until said control means actuates a control contact means connected in series with a selector contact means set to said actuated position thereof.

5. A control arrangement for business machines, comprising, in combination, a set of selector contact means respectively correlated with a series of lines, each selector contact means having an actuated position and being settable to said actuated position; a set of control contact means respectively connected in series with said selector contact means, each control contact means having an actuated position, said actuated positions of one of said sets of contacts means being circuit-breaking positions, and said actuated positions of the other set of contact means being circuit-closing positions; a stepping mechanism for successively actuating said control contact means to assume said actuated position; electrically operated means for actuating said stepping mechanism; electrically operated line shifting means connected to said electrically operated means for actuating the same after each line shifting operation; and circuit means connecting said sets of contact means with said line shifting means and including a switch for actuating said line shifting means whereby said line shifting means successively performs line spacing operations until said stepping mechanism actuates a control contact means connected in series with a selector contact means set to said actuated position thereof.

6. A control arrangement for business machines, comprising, in combination, a set of selector contact means respectively correlated with a series of lines, each selector contact means being settable to a circuit-breaking position; a set of control contact means respectively connected in series with said selector contact means, each control contact means having a circuit-closing position; control means electrically actuatable for successively actuating said control contact means to assume said circuit-closing position; electrically operated line shifting means connected to said control means for actuating the same after each line shifting operation; and circuit means connecting said sets of contact means with said line shifting means whereby said line shifting means successively performs line spacing operations until said control means actuates a control contact means connected in series with a selector contact means set to said circuit-breaking position thereof.

7. A control arrangement for business machines, comprising, in combination, a set of selector contact means correlated with a series of lines, each selector contact means being settable to a circuit-breaking position; a set of fixed contacts respectively connected in series with said selector contact means, and a movable contact movable along said fixed contacts between a plurality of circuit-closing positions; a stepping mechanism operatively connected to said movable contact for moving the same successively to said circuit-closing positions; electrically operated means for actuating said stepping mechanism; electrically operated line shifting means operatively connected to said electrically operated means for energizing the same after each line shifting operation; and circuit means connecting said movable contact with said line shifting means whereby said line shifting means successively performs line spacing operations until said movable contact engages a fixed contact connected in series with a selector contact means set to said circuit-breaking position thereof.

8. A control arrangement for business machines, comprising, in combination, a set of selector contact means correlated with a series of lines, each selector contact means being settable to a circuit-breaking position; a set of fixed contacts respectively connected in series with said selector contact means, and a movable contact movable along said fixed contacts between a plurality of circuit-closing positions; a stepping mechanism; electrically operated coupling means for coupling said stepping mechanism to said movable contact so that said stepping mechanism moves the same successively to said circuit-closing positions; electrically operated means for actuating said stepping mechanism; electrically operated line shifting means operatively connected to said electrically operated means for energizing the same after each line shifting operation; and circuit means connecting said movable contact with said line shifting means and being connected to said coupling means, and including a switch for actuating said line shifting means and said coupling means whereby said line shifting means successively performs line spacing operations until said movable contact engages a fixed contact connected in series with a selector contact means set to said circuit-breaking position thereof.

9. An arrangement as set forth in claim 8 and including a turnable contact arm supporting said movable contact and turning with the same; wherein said stepping mechanism includes a stepping wheel; a shaft supporting said contact arm and said stepping wheel for turning and axial movement; wherein said coupling means include one coupling part secured to said contact arm and another coupling part secured to said stepping wheel; a spring for urging said contact arm away from said fixed contacts and said one coupling part toward the other coupling part; and wherein said electrically operated coupling means includes a member for urging said other coupling part against said first-mentioned coupling part and said contact arm to a position in which said movable contact engages one of said fixed contacts against the action of said spring.

10. An arrangement as set forth in claim 9 wherein said electrically operated coupling means includes an electromagnetic means connected to said switch, and wherein said member is actuated by said electromagnetic means, and including a spring urging said member to a position in which said coupling parts are disengaged.

11. A control arrangement for business machines, comprising, in combination, a set of selector contact means correlated with a series of lines, each selector contact means being settable to a circuit-breaking position; a set of fixed contacts respectively connected in series with said selector contact means, and a movable contact movable along said fixed contacts between a plurality of circuit-closing positions; a normally open relay contact in series with said selector contact means and said movable contact; a stepping mechanism including a stepping wheel operatively connected to said movable contact for moving the same successively to said circuit-closing positions; electrically operated means for actuating said stepping mechanism and including an electromagnetic means having an armature, a stepping pawl means connected to said armature and being operatively connected to the stepping wheel for shifting the same, and a normally open relay contact connected in series with said electromagnetic means; electrically operated line shifting means operatively connected to said electrically operated means for energizing the same after each line shifting operation; and circuit means connecting said movable contact with said line shifting means and including a delayed action relay means controlling said relay contacts and a switch for actuating said line shifting means and said relay means whereby said line shifting means successively performs line spacing operations until said movable contact engages a fixed contact connected in series with a selector contact means set to said circuit-breaking position thereof.

12. An arrangement as set forth in claim 11 and including a normally open relay contact connected in series with said line shifting means and operated by said delayed action relay means.

13. A control arrangement for business machines, comprising, in combination, a set of selector contact means correlated with a series of lines, each selector contact means being settable to a circuit-breaking position; a set of fixed contacts respectively connected in series with said selector contact means, and a turnable contact arm having a movable contact movable along said fixed contacts between a plurality of circuit-closing positions; a stepping mechanism including a stepping wheel connected to said arm for turning movement therewith for moving said movable contact successively to said circuit-closing positions; electrically operated means including an electromagnetic means having an armature, and a pawl cooperating with said stepping wheel for shifting the same and for actuating said stepping mechanism; electrically operated line shifting means operatively connected to said electromagnetic means for energizing the same after each line shifting operation; and circuit means connecting said movable contact with said line shifting means whereby said line shifting means successively performs line spacing operations until said movable contact engages a fixed contact connected in series with a selector contact means set to said circuit-breaking position thereof.

14. A control arrangement for business machines, comprising, in combination, a set of selector contact means correlated with a series of lines, each selector contact means being settable to a circuit-breaking position; electric locking means for locking all said selector contact means in said circuit-breaking position; a relay contact connected in series with said electric locking means and being normally closed; a relay for controlling said relay contact; a set of fixed contacts respectively connected in series with said selector contact means, and a turnable contact arm having a movable contact movable along said fixed contacts between a plurality of circuit-closing positions; another fixed contact engaged by said movable contact in a terminal position of said contact arm, said other fixed contact being connected into the circuit of said relay to energize the same in said terminal position of said arm whereby said locking means is released; a stepping mechanism including a stepping wheel connected to said arm for turning movement therewith for moving said movable contact successively to said circuit-closing positions; electrically operated means including an electromagnetic means having an armature, and a pawl cooperating with said stepping wheel for shifting the same and for actuating said stepping mechanism; electrically operated line shifting means operatively connected to said electro-magnetic means for energizing the same after each line shifting operation; and circuit means connecting said movable contact with said line shifting means whereby said line shifting means successively performs line spacing operations until said movable contact engages a fixed contact connected in series with a selector contact means set to said circuit-breaking position thereof.

15. A control arrangement for business machines, comprising, in combination, a set of selector contact means correlated with a series of lines, each selector contact means being settable to a circuit-breaking position; a set of manually operated spring-loaded push buttons for respectively moving selector contact means to said circuit-breaking positions; electric locking means for locking all said selector contact means in said circuit-breaking position; a relay contact connected in series with said electric locking means and being normally closed; a relay for controlling said relay contact; a set of fixed contacts respectively connected in series with said selector contact means, and a turnable contact arm having a movable contact movable along said fixed contacts between a plurality of circuit-closing positions; another fixed contact engaged by said movable contact in a terminal position of said contact arm, said other fixed contact being connected into the circuit of said relay to energize the same in said terminal position of said arm whereby said locking means is released; a stepping mechanism including a stepping wheel connected to said arm for turning movement therewith for moving said movable contact successively to said circuit-closing positions; electrically operated means including an electromagnetic means having an armature, and a pawl cooperating with said stepping wheel for shifting the same and for actuating said stepping mechanism; electrically operated line shifting means operatively connected to said electromagnetic means for energizing the same after each line shifting operation; and circuit means connecting said movable contact with said line shifting means whereby said line shifting means successively performs line spacing operations until said movable contact engages a fixed contact connected in series with a selector contact means set to said circuit-breaking position thereof.

16. A control arrangement for business machines, comprising, in combination, a set of selector contact means respectively correlated with a series of lines, each selector contact means having an actuated position and being settable to said actuated position; a set of manually operated spring-loaded push buttons for respectively moving said selector contact means to said actuated positions; a set of control contact means respectively connected in series with said selector contact means, each control contact means having an actuated position, said actuated positions of one of said sets of contact means being circuit-breaking positions, and said actuated positions of the other set of contact means being circuit-closing positions; control means electrically actuatable for successively actuating said control contact means to assume said actuated position; electrically operated line shifting means connected to said control means for actuating the same after each line shifting operation; and circuit means connecting said sets of contact means with said line shifting means whereby said line shifting means successively performs line spacing operations until said control means actuates a control contact means connected in series with a selector contact means set to said actuated position thereof.

17. In a business machine including a carriage and tabulator means for moving said carriage to spaced positions, said tabulator means including a tabulator relay, a control arrangement comprising, in combination, a set of selector contact means respectively correlated with a series of lines, each selector contact means being settable to a circuit-breaking position; a set of control contact means respectively connected in series with said selector contact means, each control contact means having a circuit-closing position; control means electrically actuatable for successively actuating said control contact means to assume said circuit-closing position; electrically operated line shifting means connected to said control means for actuating the same after each line shifting operation; and circuit means connecting said sets of contact means with said line shifting means, and including a first switch for actuating said line shifting means and a second switch for energizing said tabulator relay whereby said line shifting means successively performs line spacing operations until said control means actuates a control contact means connected in series with a selector contact means set to said circuit-breaking position thereof.

18. In a business machine including a carriage, a control arrangement comprising, in combination, a set of selector contact means respectively correlated with a series of lines, each selector contact means being settable to a circuit-breaking position; a set of control contact means respectively connected in series with said selector contact means, each control contact means having a circuit-closing position; control means electrically actuatable for successively actuating said control contact means to assume said circuit-closing position; electrically operated line shifting means connected to said control means for actuating the same after each line shifting operation; electrically operated carriage return means operatively connected to said line shifting means for effecting a line spacing operation during each carriage return; and circuit means connecting said sets of contact means with said line shifting means and including a switch for actuating said carriage return means and line shifting means and a limit switch operated by said carriage in a terminal position to interrupt the circuit of said line shifting means and carriage return means whereby said line shifting means successively performs line spacing operations until said control means actuates a control contact means connected in series to a selector contact means set to said circuit-breaking position thereof.

19. A control arrangement for business machines, comprising, in combination, a set of selector contact means correlated with a series of lines, each selector contact means being settable to a circuit-breaking position; a keyboard including a set of manually operable keys selectively connected to said selector contact means for moving the same to said circuit-breaking positions; a set of fixed contacts respectively connected in series with said selector contact means, and a turnable contact arm having a movable contact movable along said fixed contacts between a plurality of circuit-closing positions; a stepping mechanism including a stepping wheel connected to said arm for turning movement therewith for moving said movable contact successively to said circuit-closing positions; electrically operated means including an electromagnetic means having an armature, and a pawl cooperating with said stepping wheel for shifting the same and for actuating said stepping mechanism; electrically operated line shifting means operatively connected to said electromagnetic means for energizing the same after each line shifting operation; and circuit means connecting said movable contact with said line shifting means whereby said line shifting means successively performs line spacing operations until said movable contact engages a fixed contact connected in series with a selector contact means set to said circuit-breaking position thereof.

20. An arrangement as set forth in claim 19 and including coupling means for coupling said stepping wheel with said contact arm; electromagnetic means for operating said coupling means; and a switch for energizing said electromagnetic means.

References Cited in the file of this patent

UNITED STATES PATENTS

| | | |
|---|---|---|
| 2,138,646 | Scharr | Nov. 29, 1938 |
| 2,584,817 | Sill | Feb. 5, 1952 |
| 2,825,620 | Sperry et al. | Mar. 4, 1958 |
| 2,944,651 | Malcolm et al. | July 12, 1960 |